United States Patent [19]

Poggio et al.

[11] Patent Number: 5,325,475
[45] Date of Patent: Jun. 28, 1994

[54] COMPUTER METHOD AND APPARATUS FOR MATCHING BETWEEN LINE DRAWINGS

[75] Inventors: Tomaso Poggio, Wellesley; Stephen E. Librande, Framingham, both of Mass.

[73] Assignee: Massachusetts Institute of Technology, Cambridge, Mass.

[21] Appl. No.: 942,537

[22] Filed: Sep. 9, 1992

[51] Int. Cl.⁵ .............................................. G06F 15/62
[52] U.S. Cl. .................................... 395/133; 395/136; 395/142
[58] Field of Search .............................. 395/133–139, 395/142, 152; 340/725, 728, 747; 345/122, 131

[56] References Cited

U.S. PATENT DOCUMENTS

| | | | |
|---|---|---|---|
| 4,600,919 | 8/1982 | Stern | 340/747 X |
| 4,797,836 | 1/1989 | Witek et al. | 395/136 X |
| 4,952,051 | 8/1990 | Lovell et al. | 340/725 X |
| 5,107,252 | 4/1992 | Traynar et al. | 340/725 X |

FOREIGN PATENT DOCUMENTS

0440218A3 8/1991 European Pat. Off. .
WO 92/03799 3/1992 World Int. Prop. O. .

OTHER PUBLICATIONS

T. S. Huang et al., "Motion and Structure from Orthographic Projections", IEEE Transactions on Pattern Analysis and Machine Intelligence, 2(5):536–540 (May 1989).

A. Shashua, "Correspondance and Affine Shape from Two Orthographic Views: Motion and Recognition", Massachusetts Institute of Technology, Artificial Intelligence Laboratory, A. I. Memo No. 1327 (Dec. 1991).

T. Poggio et al., "Recognition and Structure from one 2D Model View: Observations on Prototypes, Object Classes and Symmetries", Massachusetts Institute of Technology, Artificial Intelligence Laboratory, A. I. Memo 1347 Feb. 1992).

Henry Bourtman, "The Future of Type?," MacUser (Jul. 1991):187–195.

Peter C. Litwinowicz, "Inkwell: A 2½-D Animation System," Computer Graphics, 25(4):113–121 (Jul. 1991).

Bruce Fraser, "Flexible Fonts," MacUser (Oct. 1992):205–219.

Primary Examiner—Gary V. Harkcom
Assistant Examiner—Almis Jankus
Attorney, Agent, or Firm—Hamilton, Brook, Smith & Reynolds

[57] ABSTRACT

Computer apparatus and method determines correspondence between two shapes or drawings. Included is a computer matcher which determines point by point matches/correspondence between a source object or drawing and a target object or drawing. As applied to the generation of animation sequences, the computer matcher is given as input a source drawing, a target drawing and at least four working points on the first drawing matched to four working points on the second drawing. The matcher defines a transform vector from the initially given working points of the first drawing and working points of the second drawing and their association. With the transform vector, the matcher performs a vector transformation of each of the remaining points on the first drawing to a respective point on the second drawing. This generates a correspondence and thus match between remaining points on the first drawing with respective remaining points on the second drawing. Additional processing with a ranking function provides a single match from possible multiple matches for each of the remaining points on the first drawing with a respective remaining point on the second drawing. The ranking function also confirms matches made by the vector transformation.

30 Claims, 4 Drawing Sheets

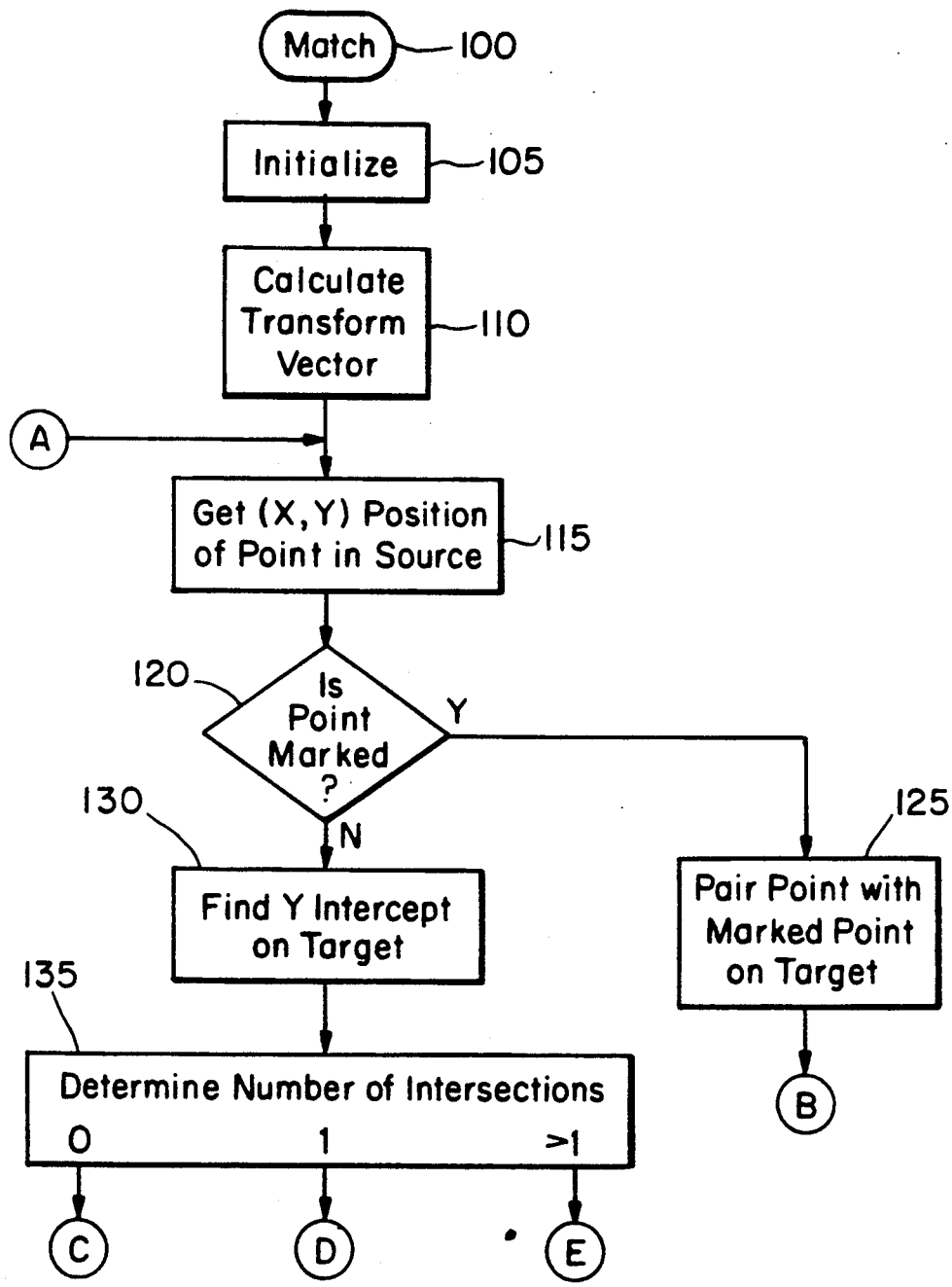
Fig. 4 Part 1 of 2

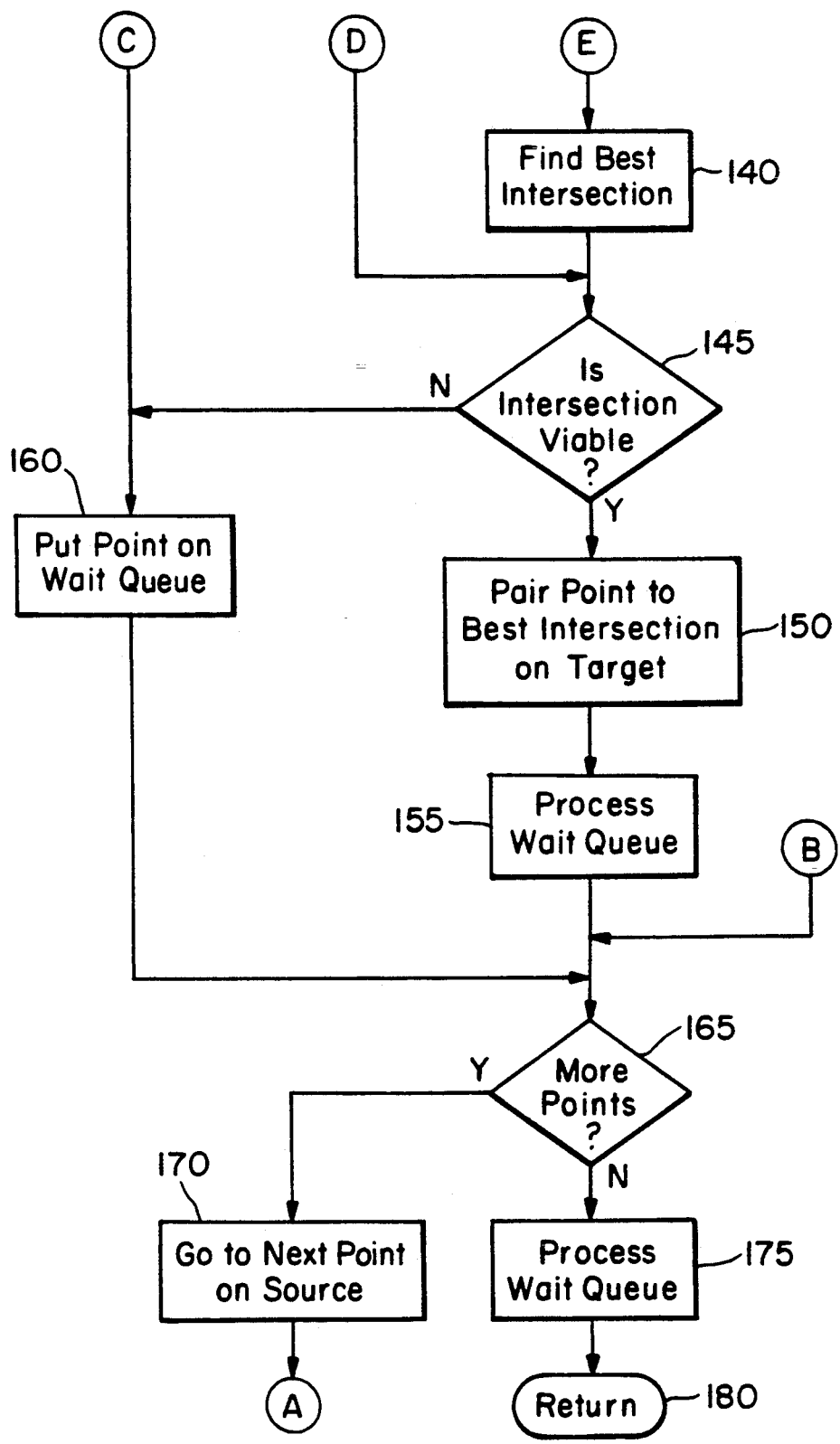
Fig. 4 Part 2 of 2

COMPUTER METHOD AND APPARATUS FOR MATCHING BETWEEN LINE DRAWINGS

GOVERNMENT SUPPORT

The invention described herein was supported in whole or in part by Contract Nos. N00014-91-J-1270 under the Office of Naval Research (ONR) and N00014-91-J-4038 under the Advanced Research Projects Agency of the Department of Defense (DARPA).

BACKGROUND OF THE INVENTION

In an animated sequence, there is a series of images showing changes in subject position/pose, and/or in background, foreground or other features. For each image, there are multiple frames of drawings. Without the aid of computer animation, each frame of a given image must be redrawn. The process of redrawing each frame is tedious and time consuming.

A computer can be used to generate frames of animated drawings. Instead of drawing each frame in the animated sequence, a fewer number of key frames are actually drawn by hand or other means. Then the computer generates the necessary intermediate frames between pairs of the initial key frames to form the animation sequence. This is known as "in-betweening".

Generally, the computer generates in-between drawings using interpolation techniques on point data in an initial key-frame drawing and in a final key-frame drawing. A method of in-betweening using interpolation is described by Poggio and Brunelli in U.S. patent application Ser. No. 07/819,767. To be successful, each point on the initial drawing must be matched to a corresponding point on the final drawing. In computer animation, it is necessary to correspond control points of the initial and final key-frame drawings so the computer can interpolate between the key frames.

Matching every point between two drawings by hand is feasible when there are only a small number of control points. As the number of control points increases, the task becomes more complex and error-prone. If the drawings are matched incorrectly, then any in-between drawings generated will be incorrect.

Accordingly, there is a need for improvement in generating frames of an animation sequence, and in particular, in "in-betweening", i.e., generating in-between/intermediate drawings between given key frames.

SUMMARY OF THE INVENTION

The present invention addresses the needs of the prior art. In particular, the present invention provides computer apparatus and method for determining correspondence between two shapes (or drawings). As such, the present invention provides a computer matcher for determining point by point, matches/correspondence between a first object (e.g., drawing) and a target object (e.g., drawing) whether the objects have similar shapes, or one object is a distortion of the other object, or the two objects are different in a variety of geometrical features (e.g., different total number of points in each drawing).

In a preferred embodiment (for use in, for example, the generation of animation sequences), the present invention provides computer apparatus for transforming points on a first drawing to points on a second drawing. The invention apparatus includes an initial association means and a matcher coupled to the initial association means. The initial association means selects and associates a certain number of working points on the first drawing with a same number of working points on the second drawing. As such, the working points in the second drawing serve as respective matched points to the working points in the first drawing.

The matcher determines correspondence of, and thus matches, remaining points on the first drawing with respective remaining points on the second drawing. This is accomplished by the matcher performing a vector transformation of each remaining point on the first drawing to a respective point on the second drawing. The vector transformation is defined by the association between the working points of the first drawing and the working points of the second drawing formed by the initial association means.

In one embodiment, the initial association means includes a user interface that enables a user to specify at least four working points of the first and second drawings and their respective association between the first and second drawings.

In accordance with one aspect of the present invention, the matcher further provides a single match (e.g., among possible multiple matches) for each of the remaining points on the first drawing with a respective remaining point on the second drawing by performing a ranking function. In particular, the ranking function assigns a numerical value to each match. The match with a resulting ranking function value closest to a threshold value is given the highest ranking or preference, and/or is confirmed where the match was initially questioned in its correctness.

BRIEF DESCRIPTION OF THE DRAWINGS

The foregoing and other objects, features and advantages of the invention will be apparent from the following more particular description of preferred embodiments of the drawings in which like reference characters refer to the same parts throughout the different views. The drawings are not necessarily to scale, emphasis instead being placed upon illustrating the principles of the invention.

FIG. 4a–4b are flow charts of a matching routine employed in the preferred embodiment of the present invention of FIG. 2.

DETAILED DESCRIPTION OF A PREFERRED EMBODIMENT OF THE INVENTION

Figure 1A:
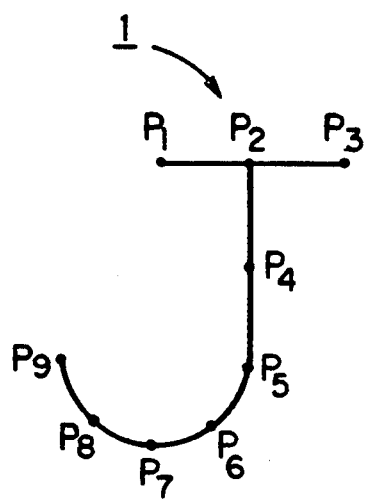
FIGS. 1a–b illustrate an example of matched/corresponding points between two similar shapes.
Figure 1B:
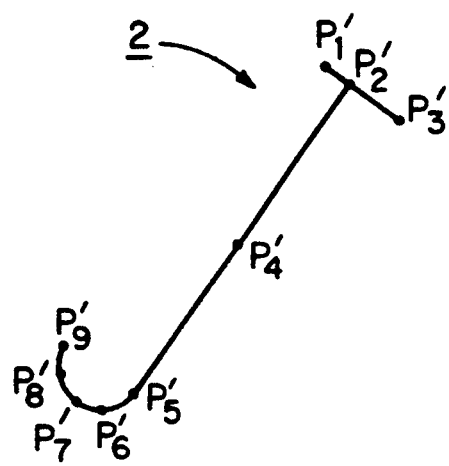

FIGS. 1a–1b illustrate matched points between two example drawings. FIG. 1a illustrates a drawing 1 of the letter "J". For simplicity and clarity of description, the drawing in FIG. 1a is shown with nine points ($P_1$, $P_2$ ... $P_9$). The number of actual points on the drawing may be more or less than nine. FIG. 1b illustrates a transformation of the subject letter "J" from FIG. 1a. Although the drawing has been rotated and deformed, a human can approximate the placement of the nine points corresponding to those shown in FIG. 1a. Those nine corresponding points ($P'_1$, $P'_2$ ... $P'_3$) are shown in FIG. 1b.

More particularly, a shape is typically composed of various sub-shapes or segments. For example, the drawing 1 in FIG. 1a can be divided into two discrete sub-shapes. One sub-shape is the straight line segment bounded by $P_1$ and $P_3$. The other sub-shape is the hook-shaped segment bounded by $P_2$ and $P_9$. The transformed straight line segment is then located in the drawing 2 of FIG. 1b and corresponding points ($P'_1$, $P'_2$, $P'_3$) are approximately labeled accordingly. Similarly, the hook-shaped segment, rotated and deformed is found in the drawing 2 of FIG. 1b. The spatial relationship among points $P_2$ through $P_9$ on the FIG. 1a drawing is then used in locating/approximating the corresponding points ($P'_2$ through $P'_9$) in the FIG. 1b drawing. Points in the transformed drawing 2 in FIG. 1b corresponding to the points in the initial FIG. 1a drawing 1 result.

Hence, in a preferred embodiment of the invention, each image or subject is divided into sub-shapes or segments and each segment is treated (processed) individually.

Figure 2:
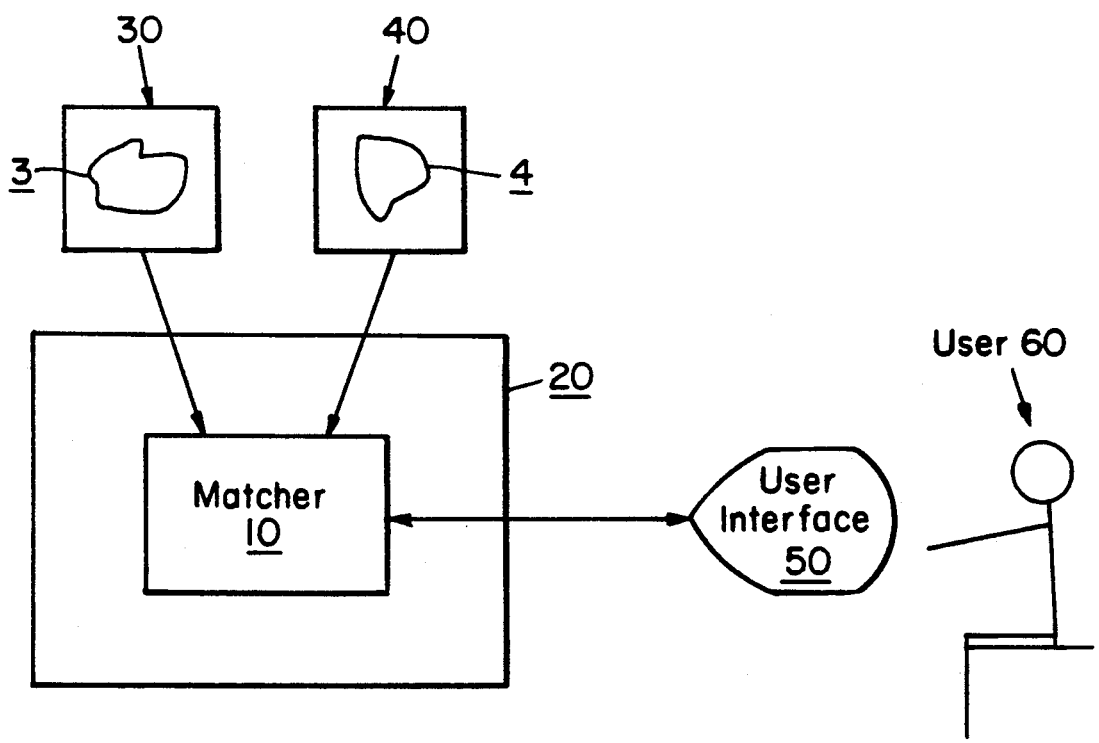
FIG. 2 is a block diagram of a preferred embodiment of the invention.

FIG. 2 is a schematic block diagram of an embodiment of the invention. A matcher 10 functions within a computer (digital processor) 20. Stored in or otherwise provided to working memory of computer 20 are two key frames of drawings 30,40 which serve as inputs to the matcher 10. A source key frame 30 contains a source drawing 3. A target key frame 40 contains a target drawing 4. A user 60, through user interface 50 (e.g., workstation and interactive or other configured program), causes the matcher 10 to match every control point on the source drawing 3 to a corresponding control point on the target drawing 4. The matcher 10 transforms the control points of source drawing 3 into the target drawing 4. This is accomplished as follows.

Figure 3:
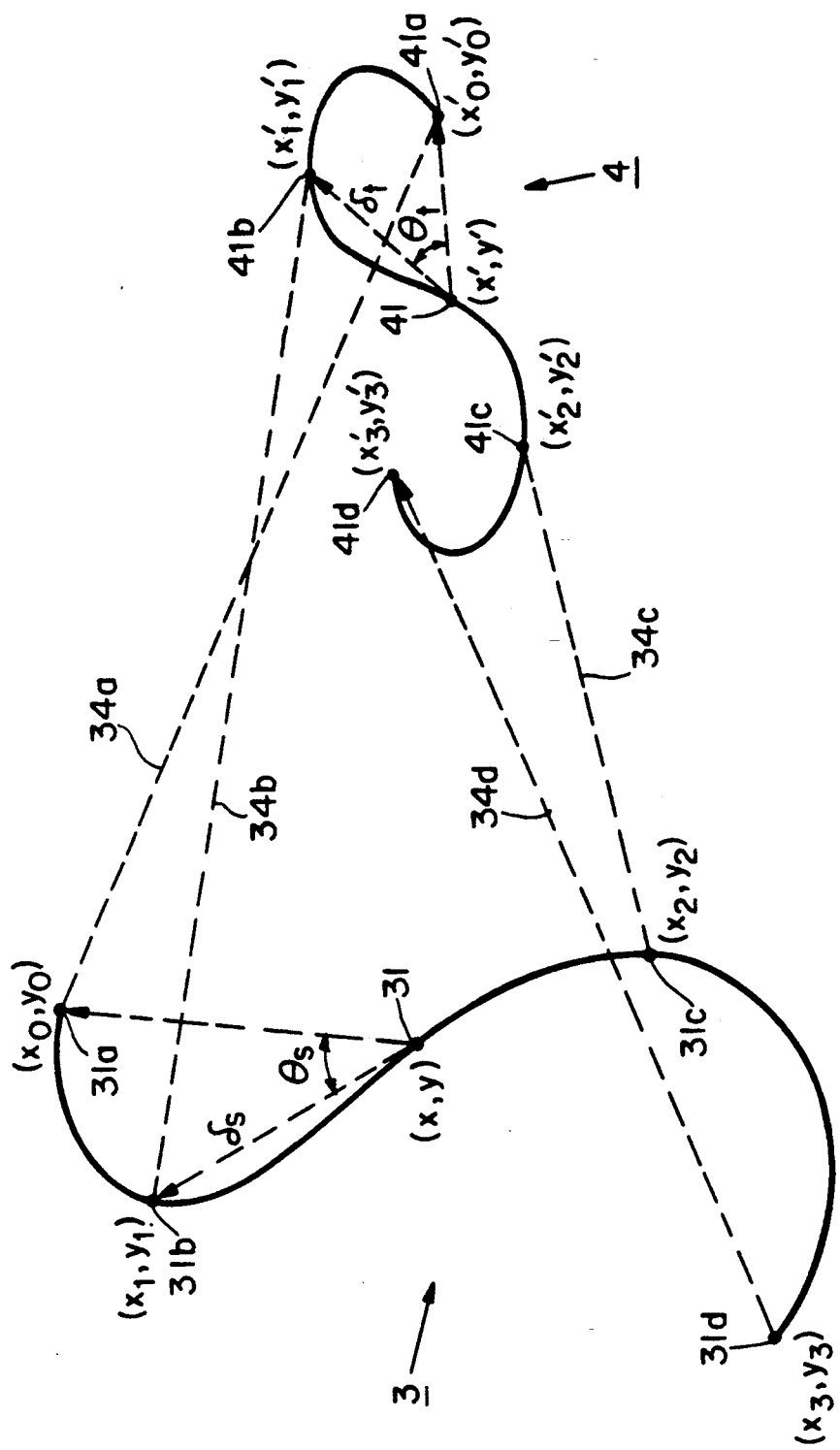
FIG. 3 illustrates an example of line-drawing-matching using a preferred embodiment of the invention.

FIG. 3 illustrates a source and target line drawings 3,4, which will be used to describe the invention. For simplicity and clarity of description, each line drawing has only one segment. The source drawing 3 is the initial key-frame 30 drawing. The target drawing 4 is the final key-frame 40 drawing. In practice, the source drawing 3 and target drawing 4 may be hand-drawn, computer generated, or scanned images input and stored in memory of computer 20. A goal of the user 60 is to generate from these given drawings 3,4 in-between (i.e., intermediate) shapes or drawings between the source drawing 3 and target drawing 4.

Before, the in-between drawings can be generated, the points on the source drawing 3 are matched to the target drawing 4. The source drawing 3 and target drawing 4 each have an arbitrary number of control points 31,41 respectively. From these arbitrary number of control points, the user identifies and marks at least four pairs of matched or corresponding points between the source drawing 3 and target drawing 4. Determining correspondences between the two drawings 3,4 is generally quickly and easily done by the user 60. Preferably, the user Selects point positions 31 that can be visually differentiated on both the source drawing 3 and target drawing 4. The end points of segments are two such points. Curve transition points are other such points. As explained below, marking the endpoints of segments reduces the chances that points will be left unmatched. In addition, marking the endpoints of segments reduces the chance of multiple intersections.

For purposes of illustration and not limitation, say for example through user interface 50, user 60 marks endpoints $31a$ and $31d$ of source drawing 3 as matching-/corresponding points to endpoints $41a$ and $41d$ respectively of target drawing 4. Likewise, say user 60 marks (through interface 50) curve transition points $31b$ and $31c$ of source drawing 3 as matching/corresponding points to curve transition points $41b$ and $41c$ respectively of target drawing 4. This produces four control point pairs $31a,41a$; $31b,41b$; $31c,41c$; and $31d$, $41d$ as illustrated in FIG. 3.

In one embodiment of the invention, the computer 20 aids the user 60 by marking four pairs of matched points between drawings 3 and 4. The endpoints $31a,31d$ of the source drawing are matched to the endpoints $41a,41d$ of the target drawing. Linear interpolation or a similar technique is used to match the remaining two pairs of points. The user 60 is permitted to alter the points marked by the computer to meet the user's better judgement. Although the computer selection of points does not always lead to correct matches as seen by the user 60, the user 60 is saved some labor.

Next, by way of overview, the present invention and in particular matcher 10 operate as follows. Given two line drawings and four pairs of matched/corresponding control points in the drawings, matcher 10 constructs a vector that represents the slope and y-intercept of a line that determines matches (i.e., corresponding points) between the two drawings. Specifically, for each point of the first drawing, the vector provides a line that intersects with a point in the second drawing. The intersected point in the second drawing is the matching or corresponding point to the subject point in the first drawing. Hence, the vector is referred to as a transform vector.

In more particular terms, of the four pairs of control points marked by the user 60 in the illustration of FIG. 3, one pair of points $31a,41a$ is used to identify respective origins of the frames of reference used for the drawings 3,4. And the other three pairs of points marked by user 60 are used to create the transform vector. That is, one marked point $31a$ on the source drawing 3 is selected to be the origin of the source drawing. The origin point $31a$ may be any marked point located anywhere on the source drawing 3. In a preferred embodiment of the invention, the first point marked by the user 60 is selected as the origin point. In an alternate embodiment of the invention, the origin point is selected at random from the set of marked points. As shown in FIG. 3, the origin of the frame of reference of source drawing 3 is located at position $(x_0,y_0)$.

After the origin point $31a$ of the source drawing 3 has been selected, the corresponding point $41a$ of the target drawing 4 becomes the origin of the frame of reference of drawing 4. In FIG. 3, the origin of the frame of reference of target drawing 4 is located at position $(x'_0,y'_0)$. The two origins are then associated with each other, such that the source origin will transform into the target origin. In response to the association, the computer 20 (via matcher 10) defines the line $34a$ connecting the two origins (as shown in FIG. 3). The origins of in-between drawings will be located on the connecting line $34a$.

In a similar manner for each of the three remaining marked pairs of points, the user specifies to matcher 10 the location in the respective drawing of each point of the pairs. That is, having determined the origins in drawings 3 and 4, user 60 specifies to matcher 10 the location of point $31b$ at $(x_1, y_1)$ in drawing 3. The corresponding point $41b$ on target drawing 4 is then located at $(x'_1, y'_1)$ in drawing 4 such that point $31b$ of drawing 3 transforms into the point $41b$ in drawing 4. User 60 specifies to matcher 10 the location of point $31c$ at $(x_2,$ $y_2$) in drawing 3. The corresponding point 41c on target drawing 4 is then located at ($x'_2$, $y'_2$) in drawing 4 such that point 31c is transformed into point 41c. Finally user 60 specifies to matcher 10 the location of point 31d at ($x_3$, $Y_3$) in source drawing 3. The corresponding point 41d on target drawing 4 is then located at ($x'_3$, $y'_3$) in drawing 4 such that point 31d is transformed into point 41d.

Further, in response to each of these associations, matcher 10 defines a respective connecting line between the associated points as shown in FIG. 3. Specifically, matcher 10 calculates (i) connecting line 34b between associated points 31b of source drawing 3 and 41b of target drawing 4, (ii) connecting line 34c between associated points 31c of source drawing 3 and 41c of target drawing 4, and (iii) connecting line 34d between associated points 31d of source drawing 3 and 41d of target drawing 4.

Curve transitions and endpoints of in-between drawings will be located on connecting lines 34b, 34c and 34d respectively.

In addition as mentioned above, matcher 10 uses the three foregoing user-marked pairs of points (31b,41b), (31,41c), (31d,41d) to calculate a transform matrix which ultimately defines the transform vector. More specifically, matcher 10 creates a transform vector [a,b,c] from the coordinates of the three non-origin user-marked points. The $y'$-intercept of the vector on the target drawing 4 is calculated from the equation $$y^1 = ax + by + cx^1 \qquad \text{Equation 1}$$

where a, b, and c are the unknowns; x and y are vectors of the known (x,y) positions in the source drawing 3; $x'$ and $y'$ are vectors of the known ($x'$,$y'$) positions in the target drawing 4.

Expanding Equation 1 for the three subject marked pairs of points, yields $$\begin{bmatrix} y_1' \\ y_2' \\ y_3' \end{bmatrix} = a \begin{bmatrix} x_1 \\ x_2 \\ x_3 \end{bmatrix} + b \begin{bmatrix} y_1 \\ y_2 \\ y_3 \end{bmatrix} + c \begin{bmatrix} x_1' \\ x_2' \\ x_3' \end{bmatrix} \qquad \text{Equation 2}$$

Solving for a, b, and c yields $$\begin{bmatrix} a \\ b \\ c \end{bmatrix} = \begin{bmatrix} x_1 & y_1 & x_1' \\ x_2 & y_2 & x_2' \\ x_3 & y_3 & x_3' \end{bmatrix}^{-1} \begin{bmatrix} y_1' \\ y_2' \\ y_3' \end{bmatrix} \qquad \text{Equation 3}$$

After the values for a,b and c are calculated, then for each point 31 on the source drawing 3, an equation can be written for a line connecting the point in the source frame 30 to a point in the target frame 40 on which any matched corresponding point 41 of target drawing 4 must lie. The equation for such a line is, from Equation 1, as follows $$y^1 = cx^1 + (ax + by) \qquad \text{Equation 4}$$

where the term (ax+by) is known and becomes the $y'$-intercept in the target frame 40, and c is the slope of the line.

Accordingly, matcher 10 applies the newly calculated transform vector [a,b,c] to every unmarked (i.e., not previously marked by user 60) point 31 on the source drawing 3. As a result, for each such source drawing point, a working line is defined. Marcher 10 then plots each resulting working line onto the target frame 40 (i.e., in the target drawing 4), and any intersections between the line and the target drawing 4 become possible locations of matches (i.e, corresponding points to the subject source drawing point).

If the source drawing 3 and target drawing 4 are exact affine transformations, then the transform vector is guaranteed to lead to perfect results. Unfortunately, when dealing with noisy data or hand-drawings, the source and target drawings are rarely exact affine transformations. Thus, in practice where generally the target drawing 4 is not an exact affine transformation of the source drawing 3, three errors may occur when performing the foregoing matcher 10 calculations. The three error cases are:

1. The resulting working line does not intersect the target drawing 4;
2. The resulting working line intersects the target drawing 4 more than once; and
3. The resulting working line intersects the target drawing 4 only once, but the intersection is "judged" to be incorrect.

To handle the three error cases, the present invention provides additional processing as follows. In cases where there are more than one intersection (case 2), the best intersection is calculated. This is accomplished using a ranking function, which assigns a numerical value to every intersection of a given working line. The closer the assigned numerical value or rank is to 0 (or a suitable predetermined threshold), the more likely the intersection is the correct choice. In the case of a single intersection (case 3), the ranking function is used to judge the correctness of the intersection.

To determine the ranking of an intersection, the distances and angles between the subject drawing points 31,41 and the respective previous matched points 31a,31b,41a,41b in the source drawing 3 and the target drawing 4 are determined. For simplicity and clarity of description, the previous matched points are also marked points. Typically, however, the previous matched points will be former subject points that had a viable best intersection.

To determine the rank "R" of a new match, the distances and angles of the subject source drawing point 31 with respect to the previous matched points 31a,31b in source drawing 3 are compared to the distances and angles between the intersection (new match) point 41 in the target drawing 4 and the previous matched points 41a,41b in target drawing 4, using the equation $$R = |\theta_t \theta_s| + C|\delta_t - \delta_s| \qquad \text{Equation 5}$$

In ranking Equation 5, $\theta_t$ is the angle between the vectors from the subject target drawing intersection point 41 to each of the two previously matched target drawing points 41a,41b;

$\theta_s$ is the angle between the vectors from subject source drawing point 31 and each of the two previously matched source drawing points 31a,31b;

$\delta_t$ is the distance between the subject target drawing intersection point 41 and the previously matched target drawing point 41b;

$\delta_s$ is the distance between the subject source drawing point 31 and the previously matched source drawing point 31b; and C is a scaler weighting that makes either angle or distance more important as desired. Higher values of C put more weight on the distance measurements and fractional values of C makes the angle measurements more important. In a preferred embodiment of the invention, C is assigned the value 1.0 to make distance and angle measurements equal in importance.

It is understood that scaled sums, percentages and the like may be used for $\theta_t$, $\theta_s$, $\delta_t$ and $\delta_s$, so that a unitless calculation is made in Equation 5.

In cases where no known intersection exists (cases 1 and 3), the subject source drawing 3 point cannot be properly matched to any point on the target drawing 4. The subject source drawing 3 point must temporarily be ignored until more information becomes available. That point is placed on a wait queue, i.e., a list of points waiting to be processed. After a point is placed on the wait queue, an attempt is made to process the next source drawing point. Once a valid match is determined, all points on the wait queue are linearly interpolated between the previous successfully processed source drawing point (having a properly defined match or corresponding point on target drawing 4) and the current successfully processed source drawing point (having a properly defined match point on target drawing 4).

FIG. 4 is a flow chart of a computer matching routine 100 that implements matcher 10 (FIG. 2). The matching routine 100 is executed by computer 20 and operates on individual segments of the source and target drawings. On input to matching routine 100, the user provides/specifies at least four pairs of matched control points per drawing segment (as described in FIG. 3), one pair identifying origins of the source and target drawing segments.

The computer 20 (routine 100) first initializes all data at step 105 in FIG. 4. Initialization includes defining the matrix sizes and initializes the matrix values to the values of the user specified matrix points (i.e., the non-origin pairs of matched points). In a preferred embodiment, the matrix can be sized to accommodate more than three pairs of user given matrix points (hence the user may specify more than four pairs of marked points in the initial steps of matcher 10 illustrated in FIG. 3). In such a preferred embodiment, additional user-marked (specified) point pairs exceeding the selected matrix size are used as an aid in curve-fitting intermediate points.

Likewise it is understood that the matrix size may be adjusted downward to accommodate less than three pairs of user specified matrix points. In that case, the user may need to only specify less than three pairs of initially matched points, one pair identifying origins in the source and target drawings and remaining pairs used to define the matrix. Applicants have found, however, that processing with four pairs of user specified points (one pair for identifying source and target drawings origins, three pairs for defining the matrix of Equation 3) minimizes user input and enables very good matching results.

After the data is initialized, the routine 100 calculates the transform vector [a,b,c] at step 110 according to Equation 3. Matching routine 100 subsequently uses the values of a, b, and c to compute a transform for each control point on the source drawing to a point on the target drawing.

In particular, routine 100 next loops at step 165 through all control points on the source drawing. Preferably, the control points on the source drawing are searched sequentially from the given (user specified) origin. The first step 115 in the loop through the source drawing is to obtain the (x,y) position of a succeeding subject point (i.e., succeeding the origin or last processed point) on the source drawing.

After the (x,y) position is calculated, the point is checked at step 120 to determine if the point is one of the initially given (i.e., user specified or marked) input points. If the point is given (i.e., has been initially marked by the user), then the corresponding point on the target drawing has also been preselected and marked on input (by the user). The subject point on the source drawing is paired with the prespecified corresponding marked point on the target drawing at step 125 in FIG. 4. If the point has not been initially marked (given on input) by the user, then the y'-intercept on the target drawing is calculated at step 130 according to Equation 4.

After the y'-intercept is calculated, the routine 100 overlays the resulting line on the target drawing and determines at step 135 the number of intercepts (i.e., number of times the line intersects) with the target drawing. There are three possible cases which can arise at this time. There can be no intersections, there can be one intersection, or there can be more than one intersection with the target drawing.

If there is no intersection with the target drawing, then the subject source drawing point is put onto a wait queue at step 160. The wait queue will be processed once a viable intersection is found for a subsequent processed source drawing point. The loop through the source drawing points continues if there are more points to process as determined at step 165 in FIG. 4. The loop begins again after incrementing to the next point at step 170 on the source drawing.

If there is more than one intersection with the target drawing (i.e., the case of multiple intersections by the calculated working line), then an array of possible intersections is created at subpart E in FIG. 4. The routine 100 determines the best intersection at step 140 in the intersection array according to Equation 5. Specifically, the routine 100 calculates for each intersection a ranking R from Equation 5. Routine 100 selects the intersection with the lowest calculated ranking value R to be the best intersection.

Once a single intersection is selected (i.e. the one existing intersection or the best intersection), the routine 100 then checks at step 145 the rank value, R, of the selected intersection to determine the viability of the corresponding target drawing point (i.e., the point at which the selected intersection crosses the target drawing). In the case of only one intersection, routine 100 makes a viability check at step 145 based on the rank value, R, calculated for that intersection. In a preferred embodiment of the invention, the ranking value, R, of an intersection must be less than or equal to a predetermined maximum allowed value in order for the corresponding intersection (target drawing) point to be considered a viable match point. In a preferred embodiment of the invention, the maximum allowed value for the rank is determined interactively by user 60 based on the relative sizes of the target and source drawings.

If the target drawing intersection point of the selected best or subject intersection is not a viable point, then the subject source drawing point is put on the wait queue at step 160. The loop through the source drawing continues as described above if there are more points at step 165 to process. The loop begins again after incrementing at step 170 to the next point on the source drawing.

If the subject intersection is at a viable point, the routine 100 pairs the subject source drawing point to the confirmed viable intersection point on the target drawing at step 150 in FIG. 4. Because a viable match has been found, the routine 100 processes the wait queue at step 155. In a preferred embodiment, the data from the most recently paired match points is used to determine matches/correspondence to the target drawing points for the source drawing points on the wait queue. In particular, for each source drawing point on the wait queue, a match point (i.e., position) on the target drawing is calculated by linearly interpolating between the previously determined pair of match points (i.e., source drawing point and corresponding target drawing point) and the newly determined pair of match points. The loop through the source drawing continues at step 165 if there are more source drawing points to process. The loop begins again after incrementing to the next point at step 170 on the source drawing.

After the routine 100 has initially processed (i.e., looped through) all points on the source drawing, there may be points remaining on the wait queue at step 175. There will be at least one point on the wait queue if the last source drawing point did not have a viable match on the target drawing. To prevent leaving source drawing points unmatched, the routine 100 processes the wait queue at step 175 (by linear interpolation between previously processed pairs of match points) prior to returning 180 control to the main/calling routine of computer 20.

Equivalents

While the invention has been particularly shown and described with reference to a preferred embodiment thereof, it will be understood by those skilled in the art that various changes in form and details may be made therein without departing from the spirit and scope of the invention as defined by the appended claims.

For example computer 20 is a minicomputer, PC, or the like. User interface 50 includes I/O devices coupled to computer 20 such as a display monitor and keyboard or mouse through which the user inputs his selections. In response, computer 20 generates and executes commands for carrying out user selections. Alternatively, a program/routine executed on user command is used to effect user selection. The term "user selection" as used herein includes user specification and/or marking of desired points in a drawing held in working memory of computer 20.

User interface 50 also includes interactive or other working programs for prompting/obtaining user input. In response to received user input, the working program formats and provides data to matcher 10 to initiate execution of matcher 10 (i.e., matching routine 100).

Such communication between user 60 and user interface 50, and between user interface 50 and matcher 10 is supported by common techniques in the art of computer programming. For example, a menu driven main program may prompt user 60 for his selection of control point pairs, and his request to run/execute matcher 10 with the desired input (i.e., given source and target drawings, and user specified control point pairs).

Other means (e.g., software routines and the like) for initially selecting and associating a desired number of working control point pairs from source and target drawings are suitable. Such means would then provide the desired input to matcher 10.

We claim:

1. In a computer system having a working memory storing (i) a first line drawing formed of a plurality of points, the points defining at least one drawing segment and (ii a second line drawing formed of at least one point, each point having a discrete position in a spatial coordinate system, apparatus for matching the position of each point form a non-empty first set of points defining a first drawing segment of the first line drawing to a point matched form a non-empty second set of points defining a second drawing segment of the second drawing, comprising:
   initial selection means for selecting a predetermined number of first working points from the first set of points and a same number of second working points from the second set of points, each working point representing the coordinate position of the corresponding selected point;
   initial association means coupled to the initial selection means for associating each first working point with a respective second working point; and
   a matcher coupled to the initial association means for determining correspondence of and thus matching the coordinate position of each non-selected point form the first set of points with the coordinate position of a matched point form the second set of points, the matcher performing a vector transformation of each non-selected point from the first set of points to a matched point from the second set of points, the vector transformation being defined by the working points as associated by the initial association means.

2. Apparatus as claimed in claim 1 wherein the initial association means includes a user interface for enabling a user to specify the association between the first working points and the second working points.

3. Apparatus as claimed in claim 1 wherein the second line drawing is a distortion of the first line drawing.

4. Apparatus as claimed in claim 1 wherein the second set of points has a different number of points than the firs set of points.

5. Apparatus as claimed in claim 1 wherein the matcher further provides a single match for each non-selected point from the first set of points with a non-selected point from the second set of points, by performing a ranking function.

6. Apparatus as claimed in claim 5 wherein the matcher further confirms matches between points from the first set of points and points from the second set of points by performing the ranking function.

7. Apparatus as claimed in claim 1 wherein the predetermined number is at least four.

8. Apparatus as claimed in claim 1 wherein the initial selection means includes a user interface for enabling a user to select at least one working point of the predetermined number of working points for each of the first and second set of points.

9. Apparatus as claimed in claim 8 wherein the user interface requires the user to select the predetermined number of second working points.

10. Apparatus as claimed in claim 1 wherein the matcher designates a first working point as a first origin point identifying the spatial coordinate system of the first set of points.

11. Apparatus as claimed in claim 10 wherein the second working point associated with the first origin point is designated as a second origin point identifying the spatial coordinate system of the second set of points.

12. Apparatus as claimed in claim 10 wherein the matcher includes a user interface for enabling a user to designate the first origin point.

13. Apparatus as claimed in claim 1 wherein the spatial coordinate system is a two-dimensional coordinate system.

14. Apparatus as claimed in claim 1 wherein the second drawing segment is of a different shape than the first drawing segment.

15. Apparatus as claimed in claim 1 wherein there are fewer than the predetermined number of points in an identified set of points, at least one point from the identified set of points is thus selected for a plurality of working points.

16. Apparatus as claimed in claim 13 wherein the identified set of points is the second set of points.

17. In a computer system having a working memory storing (i) a first line drawing formed of a plurality of points, the points defining at least one drawing segment and (ii) a second line drawing formed of at least one point, each point having a discrete position in a spatial coordinate system, a method of matching the position of each point from a non-empty first set of points defining a first drawing segment of the first line drawing to a matched point from a non-empty second set of points defining a second drawing segment of the second line drawing, comprising the steps of:
selecting the coordinate position of a predetermined number of first working points from the first set of points and a same number of second working points from the second set of points, each working point representing the coordinate position of the corresponding selected point;
associating each first working point with a respective second working point;
defining a transform vector form the coordinate positions of the associated first and second working points, the transform vector providing a mathematical relationship between the coordinate positions of points in the first set of points and the coordinate positions of points in the second set of points; and
determining correspondence of and thus matching the coordinate location of each non-selected point form the first set of points with the coordinate location of a matched point form the second set of points by applying the transform vector to each non-selected point in the first set of points.

18. A method as claimed in claim 17 wherein the step of associating includes providing a user interface for enabling a user to specify the association between the first working points and the second working points.

19. A method as claimed in claim 17 further comprising the step of performing a ranking function to limit matching to a single match for each non-selected point from the first set of points with a non-selected point from the second set of points.

20. A method as claimed in claim 17 further comprising the step of performing a ranking function for confirming matches between non-selected points form the first set of points with non-selected points from the second set of points.

21. A method as claimed in claim 17 wherein the step of selecting includes selecting at least four first working points with a same number of second working points.

22. A method as claimed in claim 21 wherein the step of defining a transform vector includes calculating the transform vector from the equation $$\begin{bmatrix} a \\ b \\ c \end{bmatrix} = \begin{bmatrix} x_1 & y_1 & x_1' \\ x_2 & y_2 & x_2' \\ x_3 & y_3 & x_3' \end{bmatrix}^{-1} \begin{bmatrix} y_1' \\ y_2' \\ y_3' \end{bmatrix}$$

where is the transform vector; $x_1$ and $Y_1$ are vectors of a first one of the first working points, $x_2$ and $y_2$ are vectors of a second one of the first working points, $x_3$ and $y_3$ are vectors of a third one of the first working points, $x'_1$ and $y'_1$ are vectors of a first one of the second working points, $x'_2$ and $y'_2$ are vectors of a second one of the second working points, $X'_3$ and $y'_3$ are vectors of a third one of the second working points, each vector being in a two-dimensional spatial coordinate system, the first working point vectors being relative to the coordinate position of a fourth one of the first working points and the second working point vectors being relative to the coordinate position of a fourth one of the second working points.

23. A method as claimed in claim 17 wherein the step of selecting includes enabling a user to select at least one working point of the predetermined number of working points for each of the first and second set of points.

24. A method as claimed in claim 23 wherein the step of selecting further includes requiring the user to select the predetermined number of second working points.

25. A method as claimed in claim 17 wherein the step of defining includes designating a first working point as a first origin point to identify the spatial coordinate system of the first set of points.

26. A method as claimed in claim 25 wherein the step of defining further includes designating the working point associated with the first origin point as a second origin point to identify the spatial coordinate system of the second set of points.

27. A method as claimed in claim 25 wherein the step of designating includes enabling a user to designate the first origin point.

28. A method as claimed in claim 17 wherein there are fewer than the predetermined number of points in an identified set of points, the step of selecting including selecting at least one point form the identified set of points for a plurality of working points.

29. A method as claimed in claim 28 wherein the identified set of points is the second set of points.

30. In a computer system having a working memory storing (i) a first line drawing formed of a first plurality of points, the points defining at least one drawing segment and (ii) a second line drawing formed of a second plurality of points, each point having a discrete position in a two-dimensional spatial coordinate system, a method of matching the coordinate position of each point of the first line drawing to a matched point of the second line drawing, comprising the steps of:
identifying at least one first drawing segment of the first line drawing, each first drawing segment defined by a non-empty first set of continuous points;

identifying at least one second drawing segment of the second line drawing, each second drawing segment defined by a non-empty second set of continuous points;

for each first drawing segment, matching the first set of points to one second set of point, the matching step comprising:
   a) selecting the position of four first working points form the first set of points and four second working points from the second set of points, each working point representing the coordinate position of the corresponding selected point;
   b) associating each first working point with a respective second working point;
   c) designating the two-dimensional coordinate systems such that the coordinate positions of the first working points are represented relative to the coordinate position of a designated one of the first working points and the coordinate positions of the second working points are represented relative to the coordinate position of a designated one of the second working points;
   d) defining a transform vector form the coordinate positions of the associated first and second working points, the transform vector providing a mathematical relationship between the coordinate positions of points in the first set of points and the coordinate positions of points in the second set of points; and
   e) determining correspondence of and thus matching the coordinate location of each remaining point from the first set of points with the coordinate location of a matched point form the second set of points by applying the transform vector to each non-selected point in the first set of points.

* * * * *

UNITED STATES PATENT AND TRADEMARK OFFICE
CERTIFICATE OF CORRECTION

PATENT NO. : 5,325,475
DATED : June 28, 1994
INVENTOR(S) : Tomaso Poggio and Stephen E. Librande It is certified that error appears in the above-indentified patent and that said Letters Patent is hereby corrected as shown below:

```
     Column 10, Claim 1, line 15 after the word "point"
change "form" to read --from--.
     Column 10, Claim 1, line 17 after "matched" change
"form" to read --from--.
     Column 10, Claim 1, line 33 change the first word "form"
to read --from--.
     Column 10, Claim 4, line 49 after "the" change "firs" to
--first--.
     Column 11, Claim 17, line 53 before the first occurrence
of "the" change "form" to read --from--.
     Column 11, Claim 17, line 54 after "point" change "form"
to read --from--.
     Column 12, Claim 22, line 16 after "where" insert the
phrase --[A,B,C]--.
     Column 12, Claim 28, line 53 after "point" change "form"
to read --from--.
     Column 14, Claim 30, line 5 after "vector" change "form"
to read --from--.
     Column 14, Claim 30, line 15 after "point" change "form"
to read --from--.
```

Signed and Sealed this

Eleventh Day of October, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,325,475
DATED : June 28, 1994
INVENTOR(S) : Tomaso Poggio and Stephen E. Librande It is certified that error appears in the above-identified patent and that said Letters Patent is hereby corrected as shown below:

Column 1, line 11, after "(DARPA)" insert the following:

--This invention was also supported by the National Science Foundation under Grant Number ASC-9217041. The government has certain rights in the invention.--

Signed and Sealed this

Twenty-third Day of May, 2000

Attest:

Q. TODD DICKINSON

*Attesting Officer*     *Director of Patents and Trademarks*